(12) United States Patent
Ganske

(10) Patent No.: US 9,320,206 B2
(45) Date of Patent: Apr. 26, 2016

(54) TREE-STYLE POTTED PLANT HOLDER AND HUBS, SUPPORTS, ADAPTERS AND WATERING SYSTEM FOR SAME

(71) Applicant: Keith Ganske, Alberta (CA)

(72) Inventor: Keith Ganske, Alberta (CA)

(*) Notice: Subject to any disclaimer, the term of this patent is extended or adjusted under 35 U.S.C. 154(b) by 0 days.

(21) Appl. No.: 14/528,381

(22) Filed: Oct. 30, 2014

(65) Prior Publication Data

US 2015/0082694 A1    Mar. 26, 2015

Related U.S. Application Data

(62) Division of application No. 13/422,396, filed on Mar. 16, 2012, now abandoned.

(60) Provisional application No. 61/454,650, filed on Mar. 21, 2011.

(51) Int. Cl.
| | |
|---|---|
| *A47G 7/04* | (2006.01) |
| *A01G 27/00* | (2006.01) |
| *A01G 9/00* | (2006.01) |
| *A01G 9/02* | (2006.01) |

(52) U.S. Cl.
CPC ............... *A01G 27/005* (2013.01); *A01G 9/00* (2013.01); *A01G 9/023* (2013.01); *A47G 7/041* (2013.01); *Y10T 137/85938* (2015.04)

(58) Field of Classification Search
CPC ......... A47G 7/041; A47G 7/02; A47G 7/045; A01G 9/022; A01G 9/023; A01G 27/005
USPC .................................................. 47/39, 82, 83
See application file for complete search history.

(56) References Cited

U.S. PATENT DOCUMENTS

| 37,070 | A | | 12/1862 | Crawford | |
|---|---|---|---|---|---|
| 47,664 | A | * | 5/1865 | Sheldon | ........................ 211/77 |
| 113,035 | A | | 3/1871 | Erkson | |
| 214,061 | A | | 4/1879 | Stearns | |
| 217,010 | A | | 7/1879 | Judson | |
| 577,230 | A | | 2/1897 | Boyd | |
| 649,665 | A | | 5/1900 | Keller | |
| 949,066 | A | * | 2/1910 | Fowler | ........................ 211/174 |
| 1,740,364 | A | * | 12/1929 | Dal Maso | ................ 248/231.31 |
| 1,747,951 | A | | 2/1930 | Reichert | |
| 1,839,607 | A | * | 1/1932 | Slauson | ........................ 211/168 |
| 2,165,654 | A | * | 7/1939 | Rosenthal | .................. 211/41.11 |
| 2,794,554 | A | * | 6/1957 | Donner | ...................... 211/85.23 |
| 3,018,898 | A | | 1/1962 | Frazelle | |
| 3,044,199 | A | * | 7/1962 | Delimal | ............................ 428/8 |

(Continued)

*Primary Examiner* — Shadi Baniani
(74) *Attorney, Agent, or Firm* — Kyle R Satterthwaite; Ryan W. Dupuis; Ade & Company Inc

(57) ABSTRACT

A potted plant holder features a number of post pieces that assemble to form a post structure that supports a number of hubs thereon, which in turn each support a number of branch-like supports. A reduced diameter end of each post piece nests within the other end of another post piece for easy assembly. Each branch has a simple wire structure with a bent end configured to form two parallel legs jutting perpendicular to the branch length for receipt of the legs in an outer opening of the hub around the post. A pot-size adapter features a ring of smaller diameter than an integral pot-supporting ring of the branch and hangers that suspend the smaller ring therefrom. A watering system features ring-shaped conduits that fit over the different levels of branches and branch conduits running outward along the branches of each level from the respective ring-shaped conduit.

4 Claims, 8 Drawing Sheets

(56) References Cited

U.S. PATENT DOCUMENTS

| | | | | |
|---|---|---|---|---|
| 3,181,706 A | * | 5/1965 | Mandel | 211/163 |
| 3,194,403 A | * | 7/1965 | Van Horn, Jr. | 211/78 |
| 3,332,654 A | * | 7/1967 | Jacobson | 211/107 |
| 3,888,354 A | * | 6/1975 | Margolin et al. | 211/110 |
| D244,571 S | | 6/1977 | Cowan, Jr. | |
| 4,117,629 A | * | 10/1978 | Ekdahl | 47/67 |
| 4,399,172 A | * | 8/1983 | DeCosmo | 428/8 |
| 4,451,510 A | * | 5/1984 | Boisvert et al. | 428/8 |
| 4,770,303 A | | 9/1988 | Boyd | |
| 4,991,344 A | | 2/1991 | Carney | |
| 5,037,049 A | * | 8/1991 | Funk | 248/165 |
| 5,150,874 A | * | 9/1992 | Spiegel et al. | 248/514 |
| 5,178,286 A | | 1/1993 | Allison, III | |
| D345,871 S | | 4/1994 | Anderson | |
| 5,428,922 A | * | 7/1995 | Johnson | 47/82 |
| 5,487,476 A | | 1/1996 | Barfield | |
| 5,598,662 A | | 2/1997 | Droste | |
| 6,333,083 B1 | * | 12/2001 | Smedley et al. | 428/8 |
| 6,595,377 B1 | | 7/2003 | Hetu | |
| 6,698,598 B1 | * | 3/2004 | Appenteng | 211/45 |
| 6,843,022 B1 | | 1/2005 | Holley | |
| 8,201,783 B1 | * | 6/2012 | Bamburg, Jr. | 248/150 |
| 8,418,403 B1 | * | 4/2013 | Nuttman | 47/82 |
| 2002/0189163 A1 | * | 12/2002 | Cooper | 47/39 |
| 2005/0082244 A1 | * | 4/2005 | Ho | 211/85.23 |
| 2006/0086681 A1 | * | 4/2006 | Buechin | 211/85.31 |
| 2008/0155892 A1 | * | 7/2008 | Katzir-Shimoni et al. | 47/39 |
| 2013/0145690 A1 | * | 6/2013 | Cannon | 47/66.7 |

\* cited by examiner

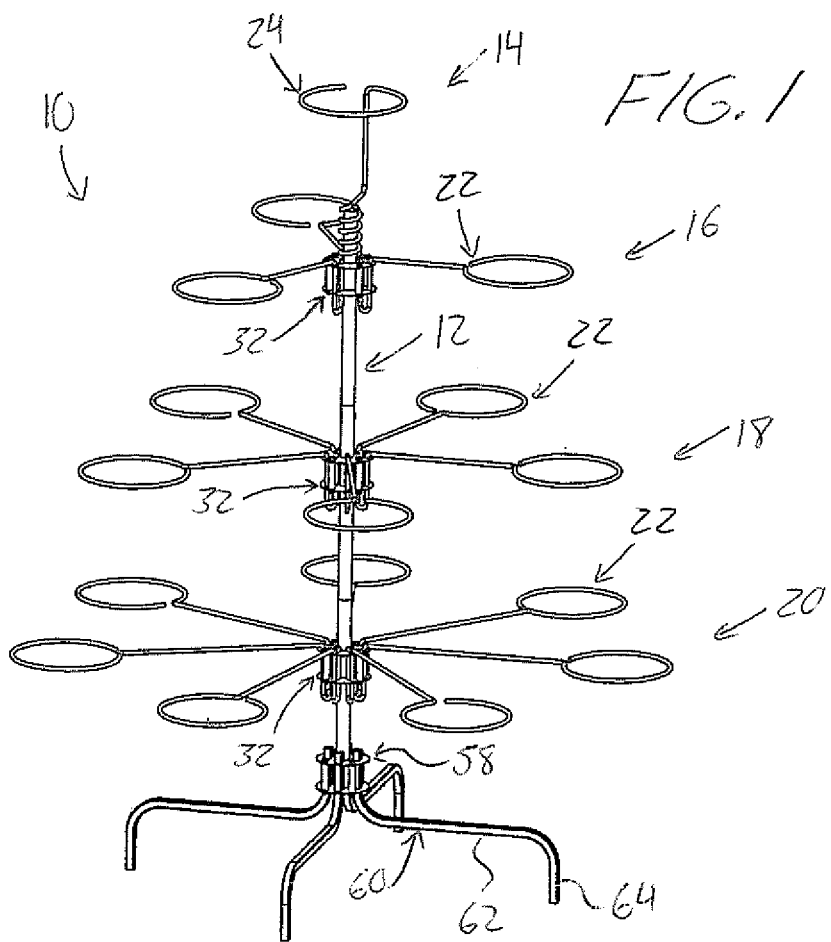
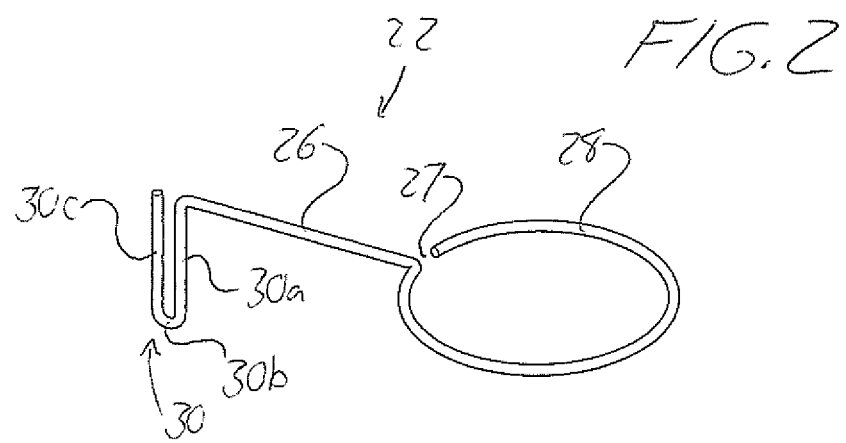

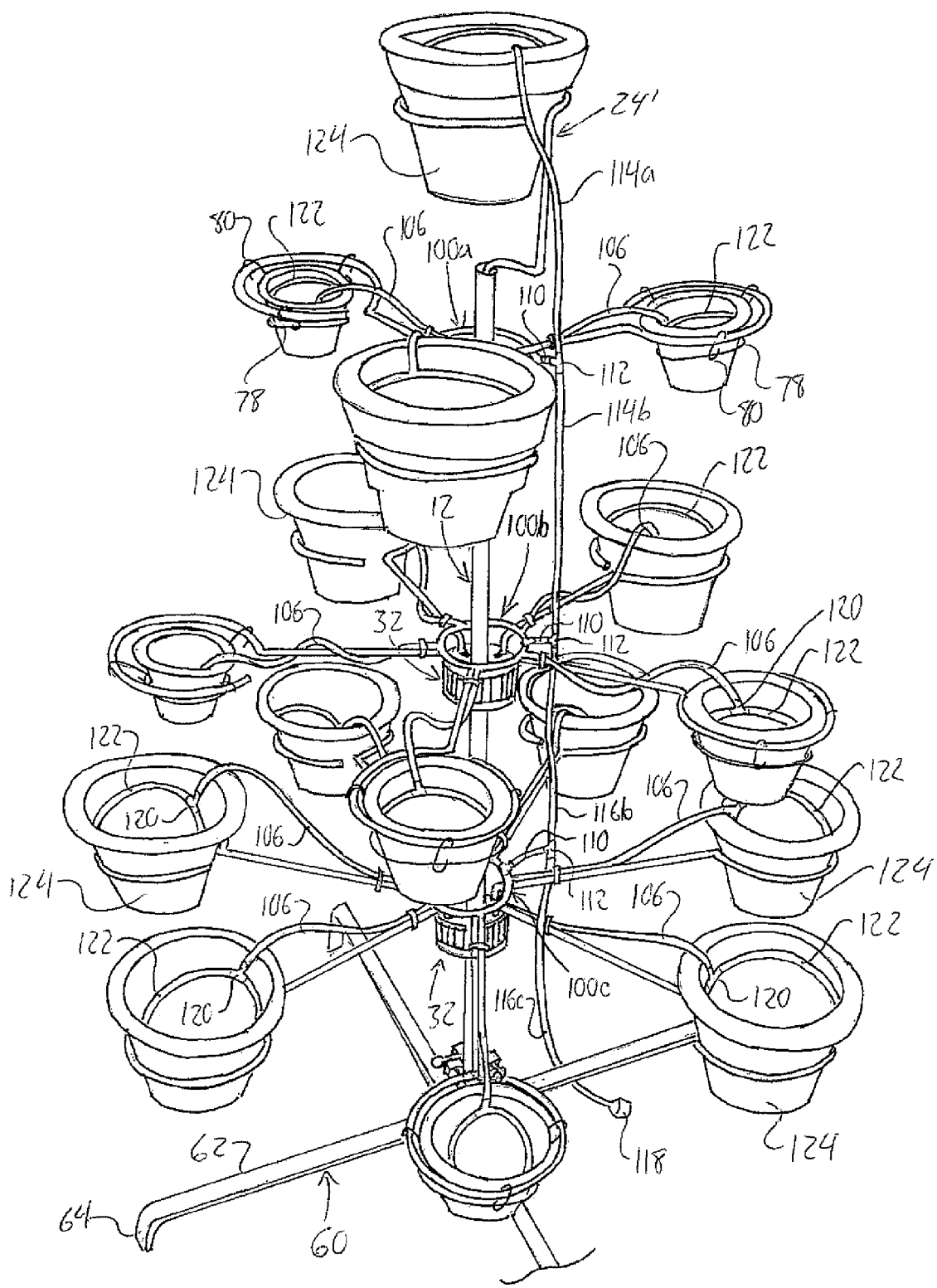

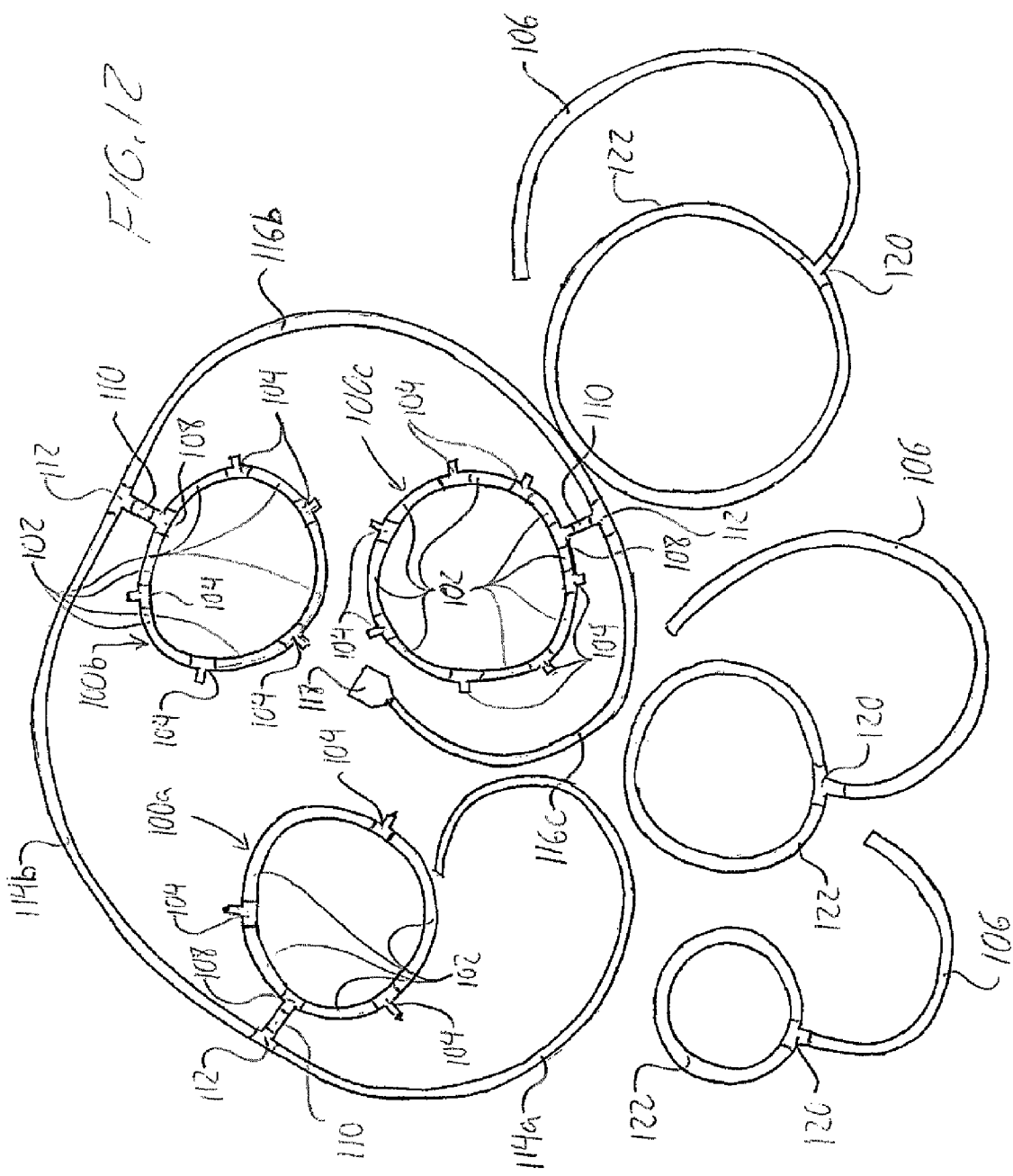

TREE-STYLE POTTED PLANT HOLDER AND HUBS, SUPPORTS, ADAPTERS AND WATERING SYSTEM FOR SAME

CROSS REFERENCE TO RELATED APPLICATIONS

This application claims benefit under 35 U.S.C. 119(e) of U.S. Provisional Patent Application Ser. No. 61/454,650, filed Mar. 21, 2011.

FIELD OF THE INVENTION

The present invention relates generally to potted plant holders and more particularly to tree-style potted plant holders wherein multiple tiers of potted plants are carried on a central upright post by radial supports extending outward therefrom to simulate branches of a tree.

BACKGROUND OF THE INVENTION

Several tree-style potted plant holders have been disclosed in the prior art. Tree shaped stands having a central pole, post or trunk and branch-like supports extending outward therefrom can be found in U.S. Pat. Nos. 37,070, 113,035, 214, 061, 649,665, 1,747,951, 3,018,898, 4,770,303, 4,991,344, 5,178,286, 5,487,476, 6,595,377, D244571, and D345871.

Watering systems for tree style plant holders are disclosed in U.S. Pat. Nos. 217,010, 577,230, 5,598,662 and 6,843,022.

However, there remains room for improvement, as Applicant has developed a unique potted plant holder assembled from a number of components providing unforeseen advantages in terms of one or more of ease or cost of manufacture or transport, ease of assembly, customizability and reconfigurability, and has developed a unique plant watering system compatible with the novel plant holder.

SUMMARY OF THE INVENTION

According to a first aspect of the invention there is provided a potted plant holder comprising:
 a plurality of elongated post pieces including:
  a bottom post member having a hollow upper end; and
  at least one additional post member comprising an upper portion of uniform cross-sectional outer periphery and a lower end of reduced cross-sectional outer periphery relative to the upper portion, the lower end of reduced cross-sectional outer periphery being sized to fit within the hollow upper end of the bottom post member and seat the upper portion of uniform cross-sectional outer periphery atop the hollow upper end of the bottom post member, and the upper portion being equal in cross-sectional outer periphery to the hollow upper end of the bottom post member;
 a plurality of hubs each comprising a central passage extending axially therethrough, the central passage having a cross-sectional size and shape sufficient to accommodate the uniform cross-sectional periphery therein;
 a plurality of elongate support branches for each hub, each support branch having an inboard end configured for support by said hub radially outward from the central passage therethrough at a respective position around said central passage and an outboard end configured as a ring for supporting a plant pot; and
 a stop device associated with each hub and operable in cooperation with said hub and any uprightly oriented post member of the plurality of elongated post members when said hub is slidably disposed around said post member to retain the hub at a select position along said post member;
 whereby the equal cross-sectional periphery of the hollow upper end of the bottom post member and the upper portion of the additional post member enables sliding of any hub from the additional post member to the bottom post member, and vice versa, while said post members are fitted together end-to-end.

According to a second aspect of the invention there is provided a potted plant holder comprising:
 an upright elongated post:
 a plurality of hubs supported on the elongated post at spaced apart positions therealong, each hub comprising a plurality of outer passages extending axially thereinto at areas outward from the elongated post at respective positions therearound and each outer passage having a slot-shaped cross-section elongated in one of two orthogonal directions;
 a plurality of elongate support branches for each hub, each support branch comprising a rod that is bent at an outboard end thereof to form a ring for supporting a pot and bent at an inboard end to form a first leg extending laterally relative to a plane of the ring and a second leg extending back along the first leg from an integral connection thereto, the legs being fittable side by side in any of the outer passages of the hub in the elongated direction of the slot-shaped cross-section thereof.

According to a third aspect of the invention there is provided a potted plant holder hub for carrying potted plant support branches on an upright elongated post, the hub comprising a body having a central passage extending axially therethrough and a plurality of outer passages extending axially into the body outward from the central passage at the respective positions therearound, the central passage having a cross-sectional size and shape sufficient to accommodate a cross-section of the upright elongated post and each outer passage having a slot-shaped cross-section elongated in one of two orthogonal directions.

According to a fourth aspect of the invention there is provided potted plant holder support branch comprising a rod that is bent at an outboard end to form a ring for supporting a pot and bent at an inboard end to form a first leg extending laterally relative to a plane of the ring and a second leg extending back along the first leg from an integral connection thereto.

According to a fifth aspect of the invention there is provided an upper potted plant support for mounting atop an upright post of a potted plant holder, the upper support stand comprising a sleeve dimensioned to slide over an upper end of the additional post member and a support ring carried on the sleeve in a position thereover.

Preferably the potted plant support comprises a bent rod that is coiled around an axis at one end thereof to define the sleeve and is bent at the other end to form the support ring.

According to a sixth aspect of the invention there is provided an adapter kit for changing a size of potted plant for which a potted plant holder having pot supporting rings is configured, the kit comprising a set of adapter rings each smaller in diameter than the pot supporting rings of the potted plant holder and a plurality of mounts configured to selectively couple the adapter rings to the rings of the potted plant holder in parallel orientations therewith to configure the support branches for nested support of smaller potted plants.

According to an eighth aspect of the invention there is provided a watering system for a potted plant holder having an upright elongated post structure and multiple sets of branches at different heights along the post structure and each comprising a plurality of elongate support branches projecting outwardly away from post structure in order to support potted plants on said support branches, the watering system comprising:

an intake conduit having an inlet arranged to couple to a water source;

a plurality of ring-shaped conduit members coupled to the intake conduit and each sized for placement over the post structure to form a water conduit that is fed by the water source and that extends around the post structure above a respective set of branches;

at least one post conduit each fluidly coupled between a respective pair of the ring-shaped conduit members to extend along the post structure to deliver water from one of said pair ring-shaped conduit members to the other of said pair of ring-shaped conduit members;

a plurality of branch conduits in fluid communication with the water conduit of each ring-shaped conduit member and extending outward therefrom to extend along the elongate support branches to the potted plants; and a water outlet at an end of each branch conduit opposite the ring-shaped conduit member to discharge water into the potted plants.

Preferably each branch conduit comprises flexible tubing.

Preferably the water outlet comprises an outlet tube arranged to discharge water therefrom at multiple points therealong.

Preferably the water outlet is ring-shaped.

Preferably the water outlet comprises a soaker hose.

Preferably the soaker hose has opposite ends thereof coupled to a T-fitting that is also coupled with an end of the branch conduit opposite the ring-shaped conduit member.

Preferably each ring-shaped conduit member comprises multiple lengths of tubing connected together by T-fittings, each of which connects the lengths of tubing of the ring-shaped conduit to a respective one of the branch conduits.

According to another aspect of the invention there is provided a watering system for potted plants, said watering system comprising:

a potted plant holder comprising an upright elongated post structure and three sets of branches at different respective levels on the post structure, each of said sets comprising a plurality of elongate support branches projecting outwardly away from post structure in order to support potted plants on ring-shaped outboard ends of said support branches;

an intake conduit defined separately and independently of the potted plant holder and having an inlet arranged to couple to a water source;

three ring-shaped conduit members defined separately and independently of the potted plant holder and coupled to the intake conduit, each of said ring-shaped conduit members being placed over the post structure in a position closing therearound and seated atop a respective set of branches at the respective level on the post structure, and each of said ring-shaped conduit members having an internal conduit that extends around the post structure and is fed by the water source via the intake conduit;

a plurality of post conduits each fluidly coupled directly between a respective pair of the ring-shaped conduit members and extending along the post structure from one of said pair of ring-shaped conduit members to the other of said pair of ring shaped members at a position located radially inwardly from the ring-shaped outboard ends of each set of branches to deliver water from the one of said pair of ring-shaped conduit members to the other of said pair of ring-shaped conduit members;

a respective plurality of branch conduits in fluid communication with the internal conduit of each ring-shaped conduit member and extending outward therefrom along the respective set of branches toward the ring-shaped outboard ends thereof, whereby each ring-shaped conduit member and the respective plurality of branch conduits are arranged to deliver water to the potted plants at the respective level on the post structure; and a water outlet at an end of each branch conduit opposite the ring-shaped conduit member to discharge water into the potted plants;

wherein each ring-shaped conduit member comprises multiple lengths of tubing connected together by T-fittings that are respectively connected to the branch conduits that extend outwardly along the respective set of branches.

BRIEF DESCRIPTION OF THE DRAWINGS

In the accompanying drawings, which illustrate exemplary embodiments of the present invention:

FIG. 1 is a perspective view of a tree-style potted plant holder of one embodiment of the present invention.

FIG. 2 is a perspective view of a branch-style pot support of the plant holder of FIG. 1.

FIG. 11 is a perspective view of a potted plant holder and corresponding plant watering system of the present invention.

FIG. 12 is an overhead plan view illustrating components of the plant watering system of FIG. 11 prior to assembly and installation.

DETAILED DESCRIPTION

Figure 3:
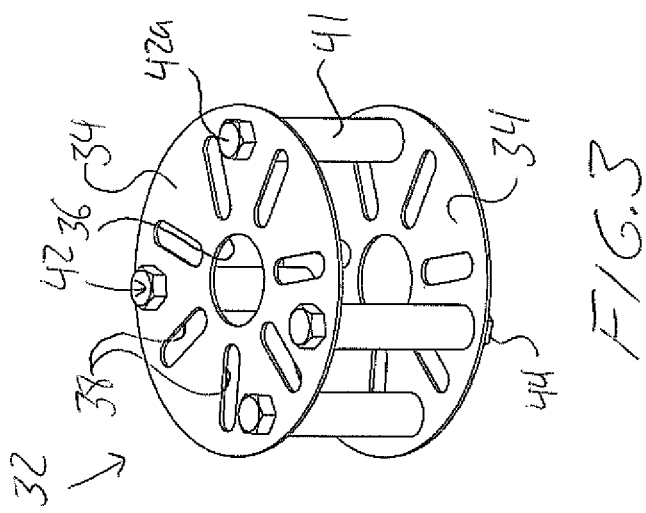
FIG. 3 is an assembled perspective view of a branch support hub of the plant holder of FIG. 1.

FIG. 1 shows an assembled tree-style potted plant holder 10 of the present invention. As in prior art holder of this style, the holder features a vertically upright post or trunk 12 having support arms or branches 14 projecting radially outward therefrom to carry potted plants (not shown) at the outboard ends of these arms distal to the post 12. The arms are arranged in tiers or levels at different vertically spaced locations along the length of the post 12, and except for an uppermost tier 14, each tier 16, 18, 20 features a plurality of arms 22 angularly spaced equally around the circumference of the post 12. The arms of each such tier are of the same length to support potted plants at that particular tier at equal radial distances outward from the post 12, while the arm length and number of arms decreases moving upward along the post 12. The uppermost tier features a single potted plant support 24 mounted atop the post 12 to carry a single potted plant over the top end thereof. Decreasing the radial arm length from tier to tier, from a longest arm length at the lowermost tier 20 to a zero radial arm length at the uppermost tier 14, gives the plant holder an upwardly tapering shape simulating that of a tree. Increasing the number of arms per tier in the downward direction functions to improve consistency in filling-out the available plant space of each tier, as the greater radial extent of the lower tiers creates a larger circular array of potted plant sites and increasing the number of potted plant supports in the larger arrays improves the consistency of plant spacing or tier density among the different tiers of the holder.

While the above described basic layout of multiple plant tiers arranged to collectively simulate a tree shape by supporting multiple levels of plants at relatively uniform plant density among the different levels is known, the holder 10 of the present invention features numerous differences from prior art tree-style potted plant holders that provide significant advantage in such areas including cost of production, ease of assembly, portability and end-user customization. The stands of the illustrated embodiments are each made up of several small space-efficient components that can be efficiently packed for easy and cost-effective transport, are easily assembled together without the use of tools, and easily disassembled back down to individual components for storage or transport. The holder is easily customizable by use of only select components during its assembly, and is easily reconfigurable to change such aspects as the number of tiers, number of arms per tier or arm length of each tier without minimal disassembly.

Figure 5:
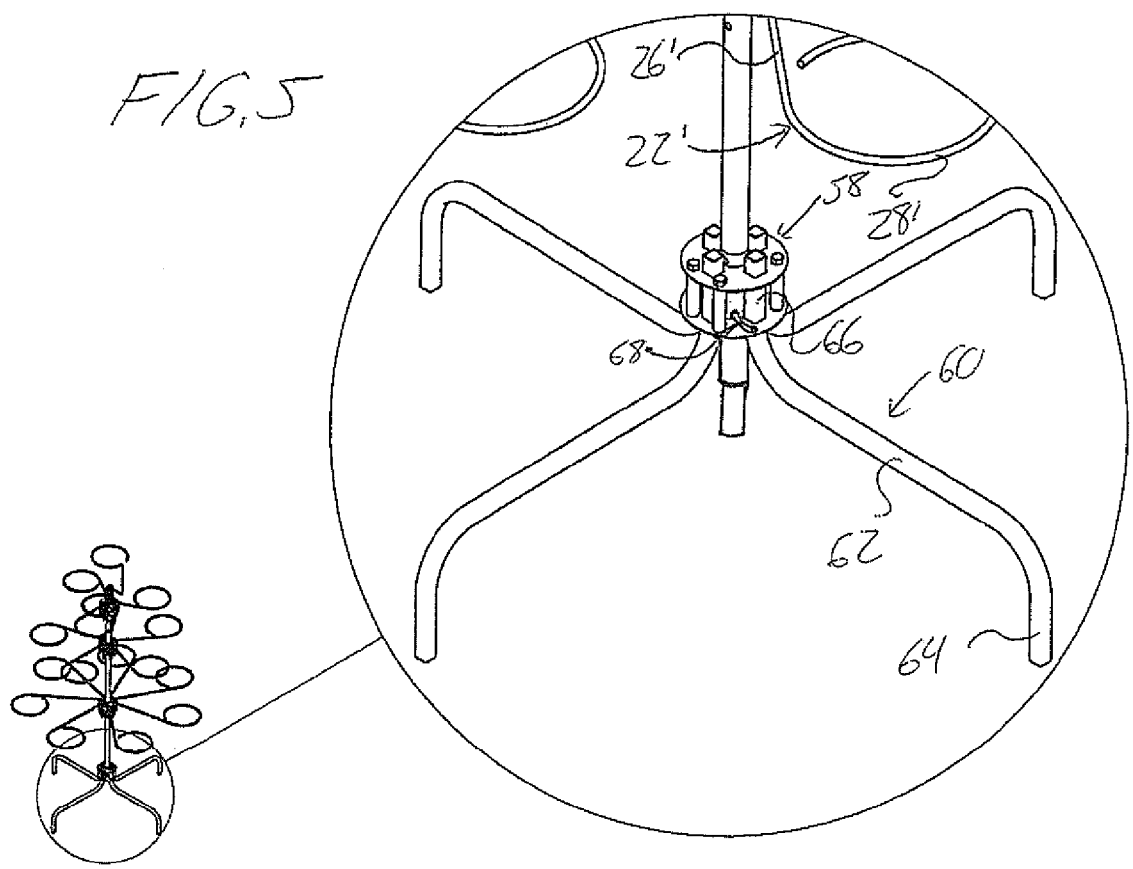
FIG. 5 shows a second embodiment tree-style potted plant holder, with a close up view of a base and leg assembly thereof.
Figure 6:
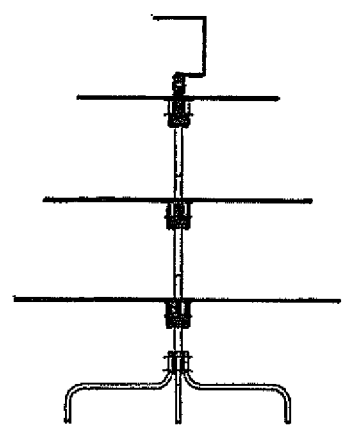
FIG. 6 is an elevational view of the plant holder of FIG. 5.

FIG. 2 shows one of the branch-style support arms 22 of the plant holder 10 of FIG. 1. The arm 22 is formed entirely from a single piece of self-supporting wire rod formed into a suitable shape described below by conventional wire bending processes, thereby avoiding the need for welding or otherwise fastening together separate pieces for each branch to minimize production costs and the degree of end-user assembly. The term self-supporting refers to sufficient rigidity in the rod to maintain its shape absent any external force sufficient to bend the rod from its current shape. The gauge of wire used provides this self-supporting rigidity in addition to sufficient shape-retaining strength to support potted plants of a size for which the holder is intended. A central portion 26 of the wire rod remains in its original straight, linearly extending condition. At one end of the central portion 26, the wire rod is bent to form nearly a full circle in the same plane as the linear central portion 26, leaving only a small gap 27 between the very end point of the wire and the end of the central portion, thereby forming a split ring 28 in or on which the pot of a potted plant can be seated. In the embodiment of FIGS. 1 and 2, the central portion 26 extends in a radial direction relative to the ring 28, while the embodiment of FIG. 5 illustrates an alternative arm support 22' in which the central portion 26' is tangential relative to the support ring 28'.

Turning back to FIG. 2, at the opposite inboard end of the central portion 26, the support arm wire is bent into a U-shape 30 in the same vertical plane as the horizontally extending vertical portion 26, i.e. in a vertical plane perpendicular to the horizontal plane of the ring 28. The U-structure 30 features a first vertical leg 30a extending downward from its integral connection with the central portion 26 of the wire rod, and a curved bottom 30b spanning through 180-degrees to join with a second vertical leg 30c extending back upward along the first leg 30a at a distance therefrom in a direction parallel thereto. The second leg terminates at the same elevation as the central portion 26 to mark the very inboard end of the wire rod and complete the U-shape configuration.

Figure 4:
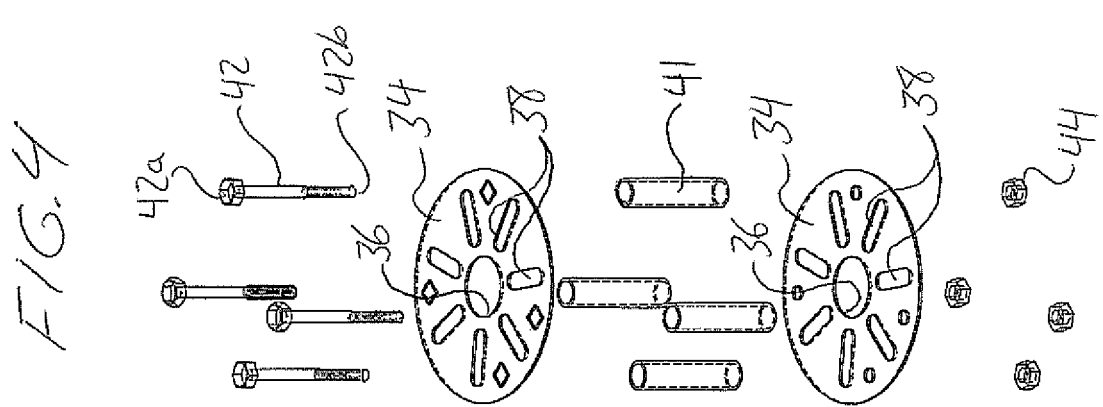
FIG. 4 is an exploded perspective view of the branch support hub of FIG. 3.

FIGS. 3 and 4 illustrate the structure of a mounting hub 32 used to carry the supports 22, 24 of each tier of the plant holder 10 on the main post 12 thereof. The hub 32 features two circular disc-shaped plates 34 disposed parallel to one another in spaced-apart horizontal planes. The two plates are of equal diameter and are aligned with one another on a vertical axis passing perpendicularly through them. Each plate 34 features a central aperture 36 that is circular in shape and centered on the vertical axis. A plurality of radial slots 38, of which there are seven in the illustrated embodiment, are provided in each plate 34 at equally spaced angular positions around the central aperture 36 between the aperture 36 and the circular outer periphery or circumference of the plate 34. A plurality of bolt holes 40 are also found in each plate 34 near the plate's circumference at respective angular positions spaced around the central aperture 36, each between a respective neighbouring pair of the radial slots. At each such bolt hole 40, a cylindrical hollow spacer 41 resides between the two plates 34 in axial alignment with this bolt hole and the respective bolt hole in the other plate. A respective bolt 42 passes through this aligned pair of bolt holes and the respective hollow cylindrical spacer 42 to seat the head 42a of the bolt atop the upper plate so that the threaded free end 42b of the bolt shaft depends downward through the bottom plate, where a respective nut 44 is threaded onto the bolt. This threaded engagement of the nut and bolt, under sufficient tightening thereof, clamps the two plates 34 against the respective ends of the spacer 42. Fastening the plates and spacer together in this bolted manner at each of the bolt holes completes the assembly of the hub, positioning the plates in alignment with one another in their spaced apart parallel planes.

The lengthwise dimension of each slot 38, i.e. the elongated radial direction, not the smaller widthwise direction, slightly exceeds the width of U-shaped end portion 30 (i.e. the perpendicular leg-to-leg distance of the U, including the diameter of both legs) of each support arm 22 while the width of each slot 38 slightly exceeds the diameter of the wire support arm 22. Accordingly, the U-shaped end portion 30 of any support arm 22 can be lowered into a selected slot 38 in the top plate of the hub 32, but only in a predetermined orientation relative thereto, as the narrow width of the slot will only accommodate the U-shaped end 30 of the support arm 22 when the width thereof substantially aligns the length of the slot 38. The height of the equal-length legs 30a, 30c of the U-shaped end portion 30 of the support arm 22 exceeds the perpendicular distance between the two horizontal plates 34 of the hub, so that lowering of the U-shaped end portion 30 through the slot in the upper plate so far as to seat the central portion 26 atop the upper plate acts to lower the curved bottom 30b of the U-shaped end portion 30 through the respective slot in the lower plate so as to hang therebeneath.

The conforming of the slot dimensions to fit closely, but not interferingly, around the U-shaped end of the support arm acts to block pivoting of the support arm 22 about any vertical axis after insertion into the hub 32 so that the support arm maintains a substantially fixed stationary position unless it is manually removed by vertical withdrawal from the respective slots of the hub. Each pair of aligned slots in the plates thus defines a respective passage extending vertical through the hub for receipt of a support arm's U-shaped end portion 30, while the slot-shaped cross-section of this passage at the ends thereof marked by the slots limits or prevents pivoting or twisting of the support arm for stable, stationary support of a potted plant at its outboard end distal to the hub. The central apertures 36 in the two end plates 34 of the hub likewise form an axial passage through the hub 32, and with reference to FIG. 1, the circular diameter of this central passage's cross-section at the ends thereof marked by the central plate apertures 36 is slightly larger than the outer diameter of the cylindrical post 12 so that each hub can be installed on the post by sliding thereover from the top end thereof down to a desired position for a respective tier of the stand. Further detail on the hub installation is provided herein below.

Figure 9:
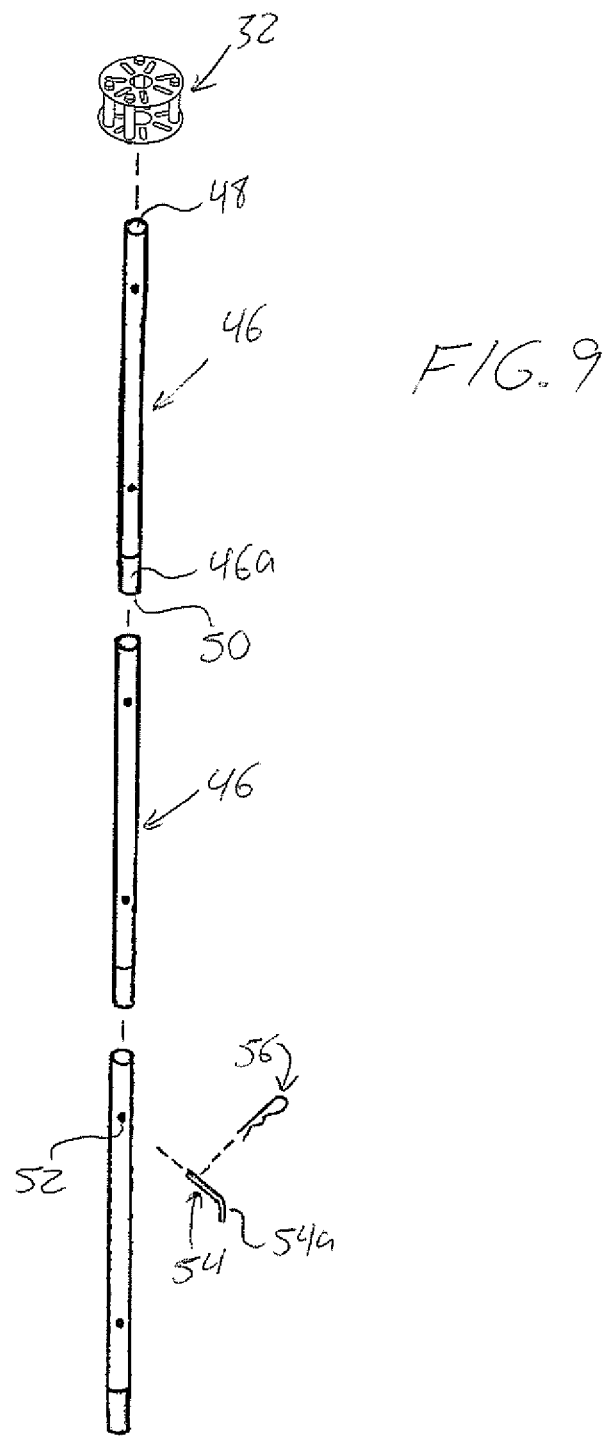
FIG. 9 is a perspective exploded view of a post and hub assembly of the illustrated plant holders.

Turning to FIG. 9, the post 12 is not of a single piece structure, but rather is assembled from multiple identical sections of hollow circular tubing 46. Each of these tubing members is of a uniform outer diameter from its top end 48 down to a position near, but upwardly spaced from, its bottom end 50. The tubing is swaged to have a smaller diameter at its lower end 50 than at the top end 48. The resulting reduced diameter lower portion 46a extends from the bottom end 50 of the member up to the transition to the larger uniform-diameter upper portion 46b of the member. The outer diameter of this reduced diameter portion 46a is slightly less than the inner diameter of the uniform diameter portion 46b so that the reduced diameter lower portion 46a of any tubular member 46 will fit within the hollow top end 48 of another. This selectable nesting of the bottom end of one tubular member in the top end of another thus combines the tubular members together end-to-end to form a length of tubing greater than their individual lengths. The illustrated embodiment shows three tubing members fitted together end-to-end to form the vertically upright post 12. Forming the post in sections allows for more space-efficient packing or storage when the plant holder is not in use, as the post sections can be stored side-by-side to avoid the significant length required to accommodate a one piece post of length equal to the assembled length of the tubular post members.

With the tubular members each having the same uniform diameter upper portion into which the reduced diameter lower portion of another member can be fully received to sit the other member's upper portion directly atop that of the member beneath it, the assembled members thus form a post 12 of substantially uniform diameter from the lower portion of the bottom member up to the top end of the top member, leaving only a fine seam between the butted together uniform diameter portions of two post members 46. This way, a hub 32 can be slid freely along the post, transitioning from one post member 46 to another without interference from any external coupling between members.

FIG. 9 demonstrates how a hub 32 is installed on the post. The hub 32 is slid onto a post assembled from multiple post members 46, or onto an individual post member 46, by fitting the central apertures of the hub plates 34 over the top end of post or member. Each vertical post member 46 features one or more, and preferably two or more, transverse holes 52 extending horizontally and diametrically through it. Before placement of the hub into sliding condition on the post or member, or while holding an already placed hub above a selected transverse hole 52 at which the hub is desired, the straight portion of a bent arm pin 54 is passed through the selected tranverse hole 52 to position the straight end of the pin shaft on the side of the respective post member 46 opposite the bent end 54a of the pin, which projects laterally from the straight portion to prevent full sliding of the entire pin through the hole 52. A hairpin cotter pin 56 is passed transversely through the straight portion of the bend arm pin 54 adjacent the free end thereof on the side of the post member 46 opposite the bent end 54a of the bent arm pin 54, thereby locking the bent arm pin in its condition passing through the post member 46 until such time as the hairpin cotter pin is later manually removed. The portions of the bent arm's straight shaft projecting radially outward from diametrically opposite sides of the post member 46 form seats onto which the bottom plate of the hub 32 is lowered, thereby seating the hub 32 at the position of the selected transverse hole 52. It will be appreciated known pin arrangements other than the illustrated bent-pin and cotter pin combination may similarly be employed to engage the post to support hubs thereon.

FIG. 5 shows a base 58 for receiving the bottom end of the post 21 and coupling a plurality of legs 60 thereto. The base features two parallel, horizontal, disc-shaped plates featuring the same central apertures and bolt holes as the hubs 32 described above. The base differs from the hubs only in that each plate lacks the slots for defining outer arm-receiving axial passages through the hub, and in place of these, features leg-receiving apertures likewise positioned between the central aperture and the outer circumference of the plate. The legs 60 of the illustrated embodiment are each formed by bending a length of tubing into a flattened S-shape having a linear central portion 62, a foot portion 64 projecting laterally from the central portion in a first direction at one end, and a coupling portion 66 projecting laterally from the central portion in an opposite second direction at the other end. The coupling portion is extended vertically upward through the leg-receiving holes in the two plates of the base 58 until the corner transition or bend between the linear portion and the coupling portion engages against the bottom plate of the base to block further upward travel of the coupling portion's top end through the base. Three or more legs, four in the illustrated embodiment, are installed in this manner so that the linear portions of the legs extend generally horizontally outward from the base 58 in different radial directions therefrom, and the foot portions depend vertically downward at the outermost extents of the legs to engage the ground, thereby carrying the base 58 centrally between the legs at an elevated position over the ground. FIG. 5 shows the legs, and thus the leg-receiving holes in the base plates, as having square or rectangular cross-section, and the closely dimensioned straight-sided shapes prevent pivoting of each leg about the vertical axis of the respective aligned bolt holes. However, it will be appreciated that other cross-sections may be use. For example, circular tubing could be used for the legs, which may be horizontally swingable in round holes to allow user-set orientations of the legs relative to the base.

With the base and legs assembled, the bottom end of the post is received through the central apertures in the top and bottom plates of the base, and held by the installer at an elevation positioning the lower one of the two transverse holes in the bottom post member between the two plates. A locking pin assembly, 68, for example like that used to later support hubs on the post, is then installed in this transverse hole in order to sit the post-traversing pin atop the bottom plate of the base and thus block sliding of the post downward through the bottom plate's central aperture, thereby maintaining the post at an elevated position off the ground to situate it's upper transverse hole a distance above the base for installation of a respective hub at that upper hole. Alternatively, the post member may include a transverse hole positioned to accept the post supporting pin above the top plate with the bottom of the post below the bottom plate. Alternatively or additionally, the post members, or at least one post member intended for use as the post bottom, may be long enough to extending through the base from the ground, which would act to seat of the post on the ground, thus making the need for a base-level support pin unnecessary. In each of these configurations, the passage of the post through the central apertures of the two base plates positions and maintains the post in an upright vertical position. The terms vertical and horizontal are being used herein to differentiate between substantially perpendicular directions, but it will be appreciated that an element described as 'vertical' may deviate somewhat from a purely vertical orientation, and the same applies to use of the term 'horizontal'.

Figure 7:
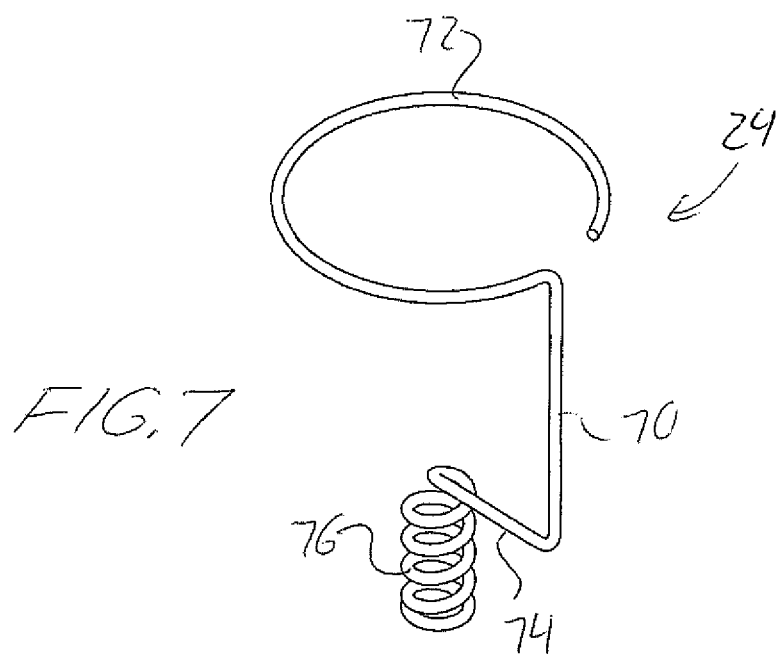
FIG. 7 is a perspective view of an upper support stand of the illustrated plant holders.
Figure 8:
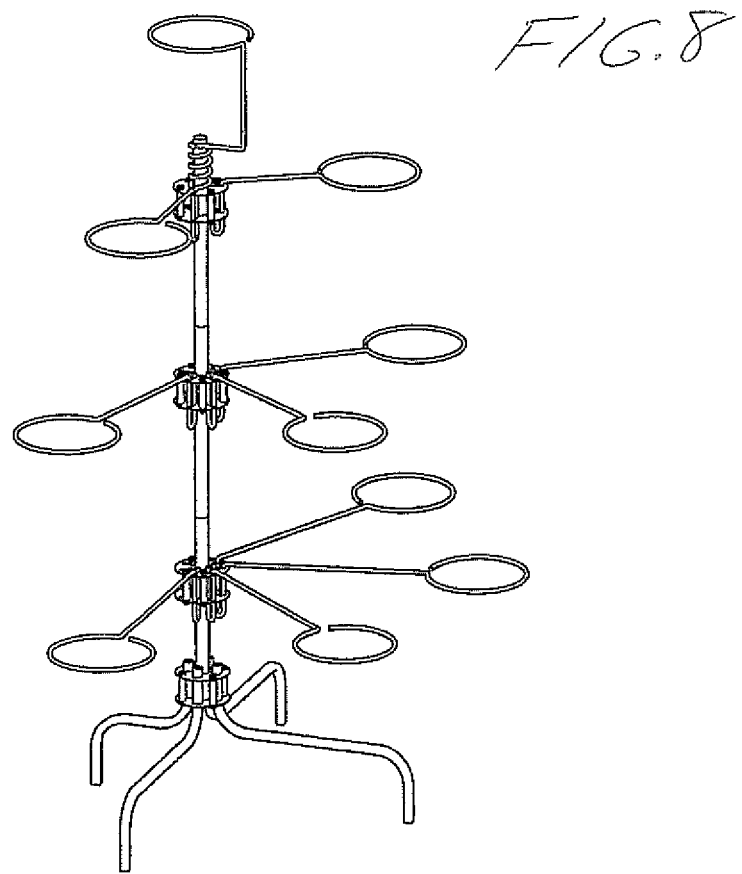
FIG. 8 is a perspective view of an assembly variation of the plant holder of FIG. 1.

FIG. 7 shows the top support stand 24 of the potted plant holder that is used to form a single-plant top tier thereof above the top end of the post 12. Like the arm or branch style supports 22, the top support 68 consists solely of a bent wire rod configured to have a suitable shape for supporting a potted plant. The top support 68 thus has a linearly extending portion 70 having a split ring 72 formed at one end thereof, but unlike the arm supports, the ring lies in a plane perpendicular to the linear portion 70, which is vertically oriented in the top support. At the opposite bottom end of the vertical linear portion 70, a horizontal linear portion 74 bends at a right angle thereto toward a same side of the linear portion as that on which the ring 72 is located. The two linear portions 70, 74 lie in a common vertical plane also containing a diameter of the horizontal circular path of the split ring 72. At the end of the horizontal linear portion 74 opposite the vertical linear portion 70, the wire rod is coiled around a vertical axis, and a uniform inner diameter of the coil 76 slightly exceeds the outer diameter of the top end of each post member 46. As shown in FIGS. 1 and 8, the coil is slipped over the top end of the uppermost member of the post 12 to seat the bottom of the coil atop a one of the hubs that has been installed on the uppermost post member at a pin-receiving transverse hole proximate the post member's top end. The close fit of the coil around the vertical post positions the ring-carrying linear portion 70 vertically to carry the ring horizontally at an elevation over the top end of the post 12, while the horizontally lateral jutting of the coil-attaching linear portion 74 provides the necessary offset of the ring-carrying linear portion to position the ring substantially concentric with the post 12.

The tree-style plant holder 10 of FIG. 1 can be easily constructed from individual components that can be sold and transported in space-efficient substantially flat-pack packaging. The installer or end-user unpacks the legs, pole members, arm supports, top support stand, and the hubs and base. The hubs and base may be preassembled, or provided as separate subcomponents (plates, spacers, bolts, nuts), which are then assembled by the installer or end-user. The legs are fitted into the base, and the post is then setup, either by placing a first post member therein and then adding two additional post members thereto, or by assembling the post members and then placing the lower end of the joined post members into the base and either setting the lower end of the post on the ground or using a pin to engage the post to the base. A pin assembly is set in the top one of the two transverse holes in the bottom post member, and a respective hub is slid onto the post and set atop this first pin assembly. A second pin assembly is likewise set in the top one of the two transverse holes in the second post member, and a respective hub is slid onto the post and set atop this first second assembly. A third pin assembly is likewise set in the top one of the two transverse holes in the top post member, and a respective hub is slid onto the post and set atop this third pin assembly. The top support stand 24 is then slid onto the top end of the post to sit atop this last/upper hub. All seven slot pairs in the bottom hub are fitted with seven provided support arms of a first length. Five of the seven slot pairs in the middle hub are fitted with five provided support arms of a second length shorter than the first. Finally, three of the seven slot pairs in the top hub are fitted with three provided support arms of a third length shorter than the first and second lengths. If the hubs and base are preassembled, the entire apparatus can be assembled without the use of any tools. Even if the hubs and base need assembly, the nut and bolt fasteners mean that only a basic conventional wrench is required.

It will be appreciated that the order of some steps may be changed from that described above. Support arms can be installed before or after installation of the respective hub, and the top support stand may be installed anytime after the top hub. The bottom hub may be installed before the middle post member is fitted into the bottom post member, just as the middle hub may be installed onto the assembled bottom and middle post members before installation of the top post member. FIG. 8 illustrates how the number of arms or branches per hub may be varied from those shown in FIG. 1. For example, a kit of parts may include seven long arms, five medium arms and three short arms, and the end-user can select which arms to use and where. For example, although a tree shape that tapers by reducing the arm length per hub moving up the post is desirable to some, the end user can select which branches to use and where, how many post sections to use, how many hubs to use, etc.

Figure 10A:
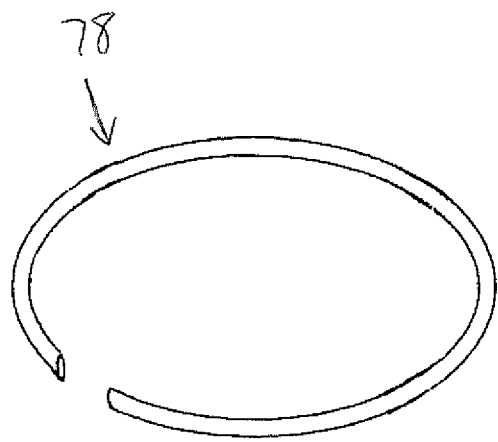
FIG. 10A is a perspective view of an adapter ring for the illustrated plant holders.
Figure 10B:
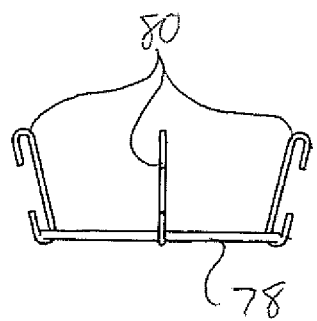
FIG. 10B is a side elevational view of the adapter ring of FIG. 10A and a series of hangers for suspending the adapter ring from the larger ring of the support of FIG. 2 or 7 in order to adapt the support for use with a smaller potted plant.

FIG. 10 illustrates an arrangement for reducing the diameter of potted plant each support of the plant holder is arranged to support. A wire rod is bent into a split-ring shape 78 having a smaller diameter than the equally sized split rings 28, 72 of the arm and top stand supports. Shorter lengths of wire are each bent into a C-shaped hanger 80 that hooks or curves back along itself at each end with a wide enough curvature to accommodate the wire-diameter of each split ring 28, 72, 78. As shown in FIG. 10B, the lower hooked end of each of a plurality of hangers 80 embraces around the bottom of the adapter ring 78. The top end of each hanger is then hooked over the top of the arm or stand support ring 28, 72 to hang the adapter ring 78 concentrically below the support ring in a plane parallel thereto. A smaller pot that would simply pass through the default ring size of each pot support can be passed downward through the support's integral ring to nest it within the smaller ring now suspended beneath the integral ring. A kit of adapter rings and hangers may be sold together with the other plant holder components, or sold separately as an optional add-on product. For example, a plant holder having its arm/branch and top stand type supports configured with a ring size suitable to nest a 10-inch pot therein may include, or separately have available, a kit for adapter the supports to an 8-inch or 6-inch pot, or both. For example, one adapter kit may feature a set of rings of one size equal in number to number of arm and stand supports included with the original plant holder product, and sufficient hangers (e.g. three per ring) to suspend them. Alternatively, the kit might includes two-sets of differently sized rings, and enough hangers for use of either full set. Through the adapter kit or system, an end-user is not limited to only a single predetermined pot size, and may reconfigure the stand to a different potted plant size at any time simply by installing. removing or substituting a set of adapter rings.

Even once an installer or end-user has assembled a plant holder, it can be easily reconfigured to take on a different appearance. For example, with reference to FIG. 1, conversion of the three tier holder to a two tier holder can be easily accomplished by removing the top support stand 24, removing the top hub, removing the top post member, replacing the arms of the bottom hub with those from the second hub (formerly the middle hub, now the top hub), installing the arms from the removed third hub (formerly the top hub, now no longer used) into the second hub, and reinstalling the top support stand onto the second post member (formerly the middle post member, now the top post member). The same result could be achieved by removing the top and middle post members and all hubs and supports thereon, then removing the bottom hub on the bottom post member for replacement by the former middle hub and its arm supports, then reinstalling one of the two removed post members onto the bottom post member and installing the former top hub and the support stand. These are only presented as examples of the flexibility, customization and reconfigurability of the illustrated plant holder system. Using the same hubs, support arm configuration and post members minimizes manufacturing costs and increase user-friendliness by reducing the number of unique parts. Using bent wire for supports, fastener-assembled hubs and simple insert or placement connections between the hubs and supports and the base and legs avoids the need for any welding. The assembled hubs use easy-to-machine end plates and readily available fasteners to avoid more intense machining of solid bodies to form insertion passages for receiving the post and the support arms.

However, it will be appreciated that some of the beneficial aspects of the above described plant stand may employed independently of one another to still provide some degree of improvement or advantage over the prior art. For example, the complimentary hub slots and wire-formed support arms designs may be employed even if the hubs are permanently fixed to a single-piece post or respective post sections of a multi-piece post or if the hubs are machined from stock or welded together. Likewise, the use of a multi-piece nested together post assembly may be used to provide a uniform post diameter allowing uninterrupted sliding of hubs therealong regardless of the type of connection employed between the hubs and the support arms and how the hub is releasably locked in at the desired installation position on the post. For example, use of set screws in hub collars is a known prior art technique for setting a hub at a selected position along a post. Also, although the illustrated and described post is circular in cross-section, slidability of hubs among and fully along assembled post members could likewise be achieved with other cross-sectional shapes (e.g. swaged rectangular tubing post with a rectangular axial passage in the hub) by similarly having reduced cross-sectional size at the lower end for nesting within the larger upper end of another member. A round post has the advantage of not requiring a particular rotational alignment between the hub and post, and thus allowing the user to set a desired angular position of the hub relative to the post. Reduced ends may be fit into larger hollow top ends, regardless of whether the post member is tubular (i.e. hollow throughout its full length). Also, the type of base, legs or stands may be varied without affecting the other advantageous feature disclosed herein.

A plant watering system of the present invention is illustrated in FIG. 11 in combination with a tree-shaped potted plant holder of the present invention. More detailed features. The system features a number of ring-shaped conduit members 100a, 100b, 100c that are equal in number to the number of hubs found on the tree-style potted plant holder. Each ring shaped conduit member 100a, 100b, 100c closes around the post at a position seated atop the branches projecting from a respective one of the hubs. With additional reference to FIG. 12, each ring-shaped conduit member is made of a number of T-fittings that exceed the number of branches at the respective hub by one, and a number of lengths of flexible tubing 102 that also exceed the number of branches at this level by one. Each length of flexible tubing interconnects two of the T-fittings, so that the T-fittings and the tubing combine to form the closed-ring shape of the resulting conduit that extends around the post. Two of the three ports of each T-fitting are thus taken up by two tubing pieces 102 of the resulting ring-shaped conduit. For all but one of the T-fittings 104 of each ring-shaped conduit, the remaining third port is coupled to a branch conduit 106 that is provided by a longer piece of flexible tubing that extends outward away from the post along a respective one of the branches, and reaches into the potted plant supported at the ring-shaped distal end of the branch. The one remaining T-fitting 108 of each ring-shaped conduit 100a, 100b, 100c each has its remaining third port coupled to a short piece of flexible tubing 110 forming a linking conduit to another T-fitting 112, from the other two ports of which extend two respective post conduits that run respectively upward and downward along the upright axis of the post or trunk of the tree-shaped stand.

At each intermediate hub between the uppermost and lowermost hubs of the stand, the flexible hose defining the upward extending post conduit 114b connects the ring-shaped conduit in question to the next ring-shaped conduit 100a further up the trunk or post of the stand, at the T-fitting 108 of the linking conduit 110 thereof, and the flexible hose defining the downward extending post 116b conduit likewise connects the ring-shaped conduit in question to the next ring-shaped conduit 100c further down the trunk or post of the stand, at the T-fitting 108 of the linking conduit 110 thereof. At the uppermost hub, the upward extending post conduit 114a does not connect to another ring-shaped conduit, but instead extends upward to the top support stand 24' at the top of the post, and into the single pot seated on this single-pot support stand. In FIG. 11, the top support stand 24' differs from the preceding embodiments in that its lacks a coiled lower end that fits externally over the top of the post, instead employing a vertical stem at its lower end for insertion into an open top end of the uppermost post member. At the lowermost hub, the downward extending post conduit 116c also does not connect to another ring-shaped conduit, but instead extends down to the ground, where a female hose coupling 118 fitted on the end of this post conduit is arranged to couple with the externally threaded male coupling of a conventional garden hose.

At the end of each branch conduit 106 opposite the respective ring-shaped conduit 100a, 100b, 100c, and at the end of the uppermost post conduit 114a opposite the uppermost ring-shaped conduit 100a, a T-fitting 120 has one port connected to this conduit 106, 114a. A length of soaker hose 122 having perforations in the wall thereof to allow water to sweat or seep from the hose at multiple locations therealong has its opposite ends coupled to the other two ports of the T-fitting 120 to form a closed loop or ring-shape at the end of the respective branch or post conduit. The closed-loop/ring-shaped soaker hose arrangement 122 is placed within the pot 124 of the respective plant, so that water discharged from the soaker hose will wet the soil of the pot at locations around the circumference thereof. FIG. 12 shows branch conduit and soaker hose assemblies of different sizes for different ones of the ring conduits. The branch conduits become longer moving down the post so as to span the longer branches to reach the pots at the end thereof, and the ring-shaped soaker hose arrangements may vary in size to fit in different pot sizes.

With reference to the illustrated embodiment, which features a three-hub plant holder and thus three ring-shaped conduits, the illustrated watering system thus operates as follows. With the lowermost post conduit 116c coupled to the garden hose, and the hose tap opened, the pressurized water source delivers water through the garden hose and into the lowermost post conduit 116c, through which the water rises into the lowermost ring-shaped conduit 100c. From here, part of the water stream flows outward through the branch conduits 106 at this lower level of branches into the respective soaker hoses 122 in order to deliver water to the potted plants at this level. A remainder of the water stream continues upward through the post conduit 116b extending upward from this lowermost ring-shaped conduit 100c, thus reaching the intermediate ring-shaped conduit 100b at the intermediate level of branches. Here, a similar splitting of the water stream takes place, some being delivered outer to the potted plants at this level through the branch conduits 106 and soaker hoses 122, and the remainder continuing upward to the uppermost ring-shaped conduit 100a at the uppermost level of branches. At this level, a final splitting of the stream occurs, delivering some water to the multiple plants at this top multi-plant level, and sending the rest of the water stream up to the single plant at the top single-plant support 24.

The watering system is easy to install during assembly of the stand. With the lowermost hub and branches installed, the ring-shaped conduits are simply lowered over the top end the assembled post-section(s). With the next higher hub in place, but no branches yet added, all of the ring-shaped conduits except the lowermost one featuring the garden hose coupling conduit are raised over this next higher hub and held in place while one or more branches are inserted at this hub. This process (raising ring-shaped conduits up over the next hub, installing branches thereat, and then seating the respective ring-shaped conduit on this hub), is repeated until the uppermost ring-shaped conduit is seated on the branches of the uppermost hub, at which point the final uppermost post conduit and attached soaker hose is lifted and placed into the single-plant at the top supper 24 of the plant stand. Tie straps, elastic bands, string, or other ties or clamps may be used to secure the watering system to the stand, for example closing around each branch conduit and the branch it extends along, as shown in FIG. 11. It will be appreciated that the post conduits may be similarly secured to the post. Again referring to FIG. 11, the branch conduits may coil around the branches in their travel from the ring conduit to the potted plant.

The watering system provides an advantage over prior art stand and watering solutions, where tubular pieces of the stand structure are used as water conduits, as such solutions using the post or trunk as a water delivery conduit require fluid-tight assembly of the post sections or use of a continuous length of pipe, thereby increasing the complexity of the assembly process or lacking the ability to break down the trunk post for compact storage or transport, and prior art solutions using pipe-shaped branches as water delivery conduits from the trunk to the plants lack the simplicity of the seat-in-place wire branch installation present invention. The present invention thus provides an easy to assembly stand, with an optional watering system included with the stand or separately available as an add-on purchase.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A watering system for potted plants, said watering system comprising:
   a potted plant holder comprising an upright elongated post structure and three sets of branches at different respective levels on the post structure, each of said sets comprising a plurality of elongate support branches projecting outwardly away from post structure in order to support potted plants on ring-shaped outboard ends of said support branches;
   an intake conduit defined separately and independently of the potted plant holder and having an inlet arranged to couple to a water source;
   three ing-shaped conduit members defined separately and independently of the potted plant holder and coupled to the intake conduit, each of said ring-shaped conduit members being placed over the post structure in a position closing therearound and seated atop a respective set of branches at the respective level on the post structure, and each of said ring-shaped conduit members having an internal conduit that extends around the post structure and is fed by the water source via the intake conduit;
   a plurality of post conduits each fluidly coupled directly between a respective pair of the ring-shaped conduit members and extending along the post structure from one of said pair of ring-shaped conduit members to the other of said pair of ring shaped members at a position located radially inwardly from the ring-shaped outboard ends of each set of branches to deliver water from the one of said pair of ring-shaped conduit members to the other of said pair of ring-shaped conduit members;
   a respective plurality of branch conduits in fluid communication with the internal conduit of each ring-shaped conduit member and extending outward therefrom along the respective set of branches toward the ring-shaped outboard ends thereof, whereby each ring-shaped conduit member and the respective plurality of branch conduits are arranged to deliver water to the potted plants at the respective level on the post structure; and
   a water outlet at an end of each branch conduit opposite the ring-shaped conduit member to discharge water into the potted plants;
   wherein each ring-shaped conduit member comprises multiple lengths of tubing connected together by T-fittings that are respectively connected to the branch conduits that extend outwardly along the respective set of branches.

2. The watering system of claim 1 wherein each branch conduit comprises flexible tubing.

3. The watering system of claim 1 wherein the water outlet comprises an outlet tube arranged to discharge water therefrom at multiple points therealong.

4. The watering system of claim 3 wherein the outlet tube has opposite ends thereof coupled to a T-fitting that is also coupled with an end of the branch conduit opposite the ring-shaped conduit member.

* * * * *